US012806693B2

(12) United States Patent
Chen

(10) Patent No.: US 12,806,693 B2
(45) Date of Patent: Nov. 24, 2026

(54) CUTTER MODULE

(71) Applicant: Darwin Precisions Corporation, Hsinchu County (TW)

(72) Inventor: Wen-Chuan Chen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 338 days.

(21) Appl. No.: 18/419,594

(22) Filed: Jan. 23, 2024

(65) Prior Publication Data

US 2025/0114844 A1 Apr. 10, 2025

(30) Foreign Application Priority Data

Oct. 5, 2023 (TW) ................................. 112138349

(51) Int. Cl.
*B23B 27/16* (2006.01)

(52) U.S. Cl.
CPC ................................ *B23B 27/1611* (2013.01)

(58) Field of Classification Search
CPC . B23B 27/1611; B23B 27/1603; B23B 27/16; B23B 27/14; B23B 27/00; B23B 27/08
USPC ............................................................ 407/30
See application file for complete search history.

(56) References Cited

U.S. PATENT DOCUMENTS 2,382,510 A * 8/1945 Seiter ...................... B23B 27/16 407/41
5,478,175 A * 12/1995 Kraemer ................. B23B 27/12 407/7
7,578,640 B2 * 8/2009 Hecht ................... B23B 27/164 407/103
8,192,112 B2 * 6/2012 Turcot ................... B27G 13/10 407/45
9,452,501 B2 9/2016 Yang et al.
9,592,622 B2 * 3/2017 Bagley ................. B26D 7/2635
10,005,132 B2 * 6/2018 Hecht ................... B23B 27/007
10,376,974 B2 * 8/2019 Morikawa ............. B23F 21/166
2008/0080937 A1 * 4/2008 Hecht ................... B23B 27/164 407/42
2009/0245947 A1 * 10/2009 Turcot ...................... B23C 5/24 407/94
2015/0113813 A1 * 4/2015 Bagley ................ B26D 7/2635 30/310
2016/0082519 A1 * 3/2016 Hecht ..................... B23B 27/04 407/100

(Continued)

FOREIGN PATENT DOCUMENTS

CN 200967226 Y 10/2007

*Primary Examiner* — Lawrence Averick
(74) *Attorney, Agent, or Firm* — WPAT, PC

(57) ABSTRACT

A cutter module including a cutter plate and at least one knife unit is provided. The cutter plate includes a base and at least one positioning slot. The positioning slots are configured to distribute along the edge of the base. Each positioning slot is sandwiched between two adjacent side walls that protrude from the base. A positioning slot has a first spacing and a second spacing. The second spacing is closer to the edge than the first spacing, and the first spacing is larger than the second spacing. A knife unit is correspondingly disposed in a positioning slot. The knife unit has a first width and a second width and the first width is larger than the second width.

16 Claims, 14 Drawing Sheets

(56) References Cited

U.S. PATENT DOCUMENTS

2017/0197264 A1* 7/2017 Morikawa ............... B23F 21/16

* cited by examiner

CUTTER MODULE

CROSS-REFERENCE TO RELATED APPLICATION

This application claims the priority benefit of Taiwan application serial no. 112138349 filed on Oct. 5, 2023. The entirety of the above-mentioned patent applications is hereby incorporated by reference herein and made a part of this specification.

TECHNICAL FIELD

The present invention relates to a cutting module. Specifically, the present invention relates to a cutting module that is convenient for cutter replacement and can be quickly and accurately positioned.

BACKGROUND

Due to design requirements, it is often necessary to perform the process of cutting on product surfaces to form the required grooves, or the process of shearing to shear thin workpieces. Among the large number of processing tools, the disc-type cutting machine can perform the purpose of a cutting process or a shearing process because of its capability to increase rotation speed. Since cutting by a disc-type cutting machine is quick and accurate, it can accurately form the required grooves on the surface of a workpiece or shear the grooves of a workpiece.

For disc-type cutting machines, since it is difficult to replace the cutter due to the present structural designs, and difficult to calibrate and position the cutter after replacing the cutter, calibration and positioning of the cutter are complex and time-consuming, making disc-type cutting machines an unfavorable choice for processing and manufacturing. In particular, some machines can only use cutters of a specific length, so the processing range is limited. In addition, some machines are designed to allow the cutter to be lengthened and shortened, but the extended length cannot be accurately positioned or adjusted, resulting in an increase in the errors in product manufacturing.

When replacing the cutter, since it is not easy to fix the cutter to a position, the cutter may be easily dropped and further cause damage to the cutter or injury to the operator, making cutter replacement an act of a certain degree of hazard. Therefore, how the cutter design of the disc-type cutting machine may be improved to make it easier for an operator to replace the cutter, reduce dropping of the cutter, quickly and accurately position the cutter, and accurately adjust the extension length is an urgent problem to be resolved for technicians in the art.

SUMMARY

An object of the invention is to provide a cutter module suitable for a plurality of disc-type cutting machines or cutter-disc type cutting machines. Such a module can facilitate quick replacement of the cutter, quick and accurate positioning of the cutter, and accurate positioning and adjustment of the extension length of the cutter, so that processing flexibility and processing accuracy of the cutting machine can be increased.

An embodiment of the invention provides a cutter module which includes a cutter plate and at least one knife unit. The knife unit has a base and at least one positioning slot. The positioning slot is disposed along the edge of the base. The positioning slot is sandwiched between two adjacent side walls, and each of the side wall is disposed protruding from the base. The positioning groove has a first spacing and a second spacing. The second spacing is nearer to the edge of the base than the first spacing, and the first spacing is larger than the second spacing. The knife unit is correspondingly disposed in the positioning slot. Each of the knife units has a first width and a second width, and the first width is larger than the second width.

Another embodiment of the invention provides a cutter module including a cutter plate and a plurality of knife units. The cutter plate includes a base and a plurality of positioning slots. These positioning slots are spaced along the edge of the base. Each of the positioning slots is sandwiched between two adjacent side walls, and each of the side walls is disposed protruding from the base. Each of the positioning slots has a first spacing and a second spacing. The second spacing is nearer to the edge of the base than the first spacing, and the first spacing is larger than the second spacing. Each of the knife units is respectively disposed in the positioning slot. Each of the knife units has a first width and a second width, and the first width is larger than the second width.

Compared to prior art, the positioning slot of the cutter module of the invention is designed to have the shape of an inverted trapezoid, and its first spacing is larger than its second spacing. The knife unit is also designed to have the shape of an inverted trapezoid, with its first width larger than its second width, and the first width and the second width respectively correspond to the first spacing and the second spacing of the positioning slot. Thus, the knife unit can stably slide into the positioning slot to reduce the problem of dropping the knife unit. In addition, both sides of the positioning slot and the knife unit respectively include a pair of side slots and side protrusions corresponding to each other. The knife unit can slide into the positioning slot more stably due to the narrow top and wide bottom design, so that chances of the knife unit falling can be further reduced. Thus, the knife unit can be quickly and accurately positioned in the positioning slot, and the elongation amount of the knife unit can be accurately adjusted and positioned. Therefore, the processing flexibility and the processing accuracy of the cutter module can be improved.

DETAILED DESCRIPTION

In various embodiments of the invention, the terminology used herein is for the purpose of describing particular embodiments only and is not limiting. As shown in the specification, unless the content clearly dictates, the singular forms "a", "an" and "the" are intended to include the plural forms including "at least one". As shown in the specification, the term "a" includes any and all combinations of one or more of the associated listed items.

In the embodiments of the invention, relative terms such as "top", "bottom", "left", "right", "front" or "back" which are not used to limit actual positions are used to describe a relationship between an element and another element, and are only used to describe orientations in the figures. The device in the figures does not limit the direction or orientation of its components upon turning over the device. The axes "D1", "D2" and "D3" in the figures are perpendicular and intersected with each other, such as the X-axis, Y-axis and Z-axis directions of the Cartesian coordinate system, but the corresponding relationship is not limited.

Figure 1:
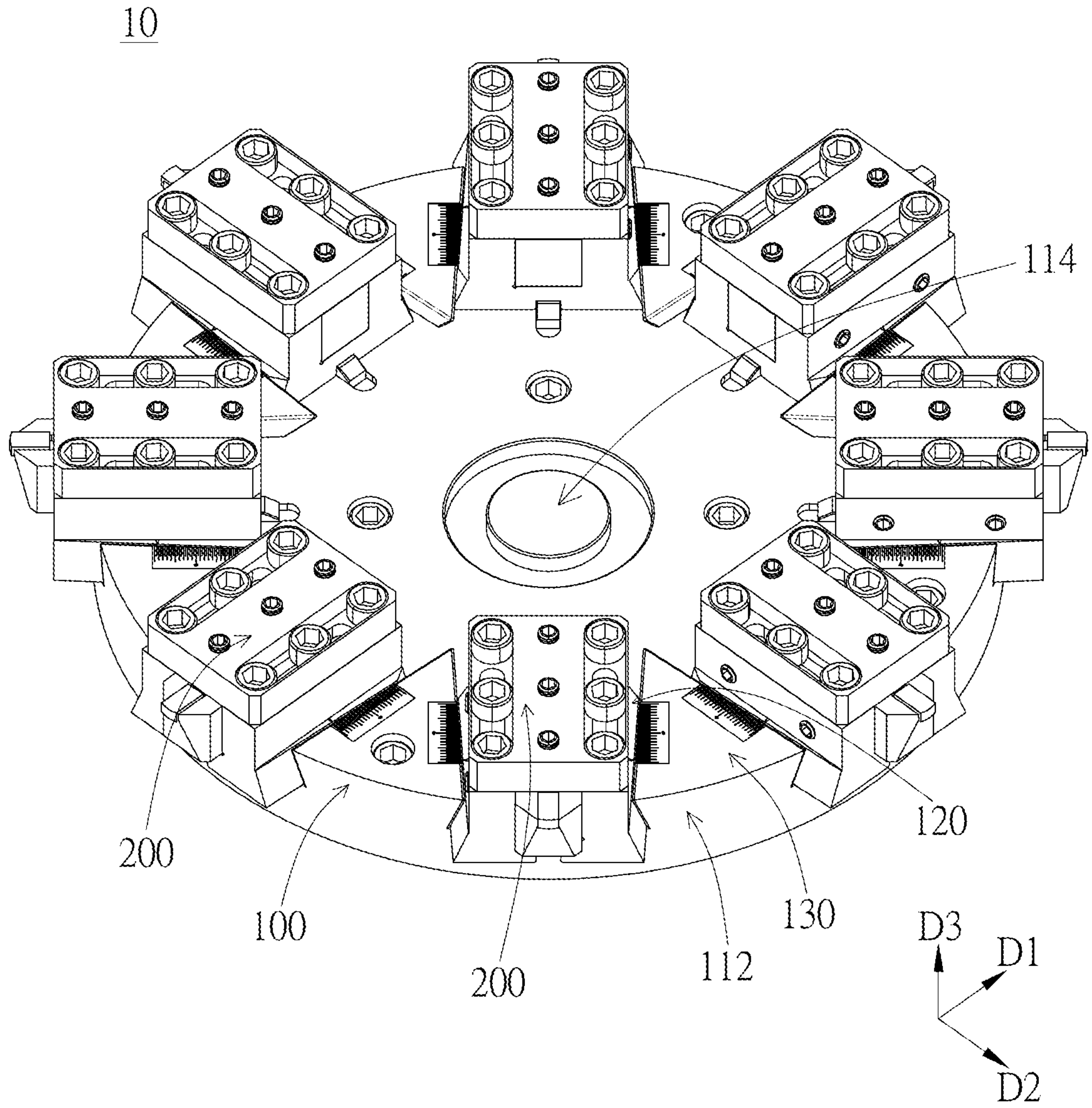
FIG. 1 is a schematic diagram illustrating a 3-D structural view of an embodiment of a cutter module of the invention.
Figure 2:
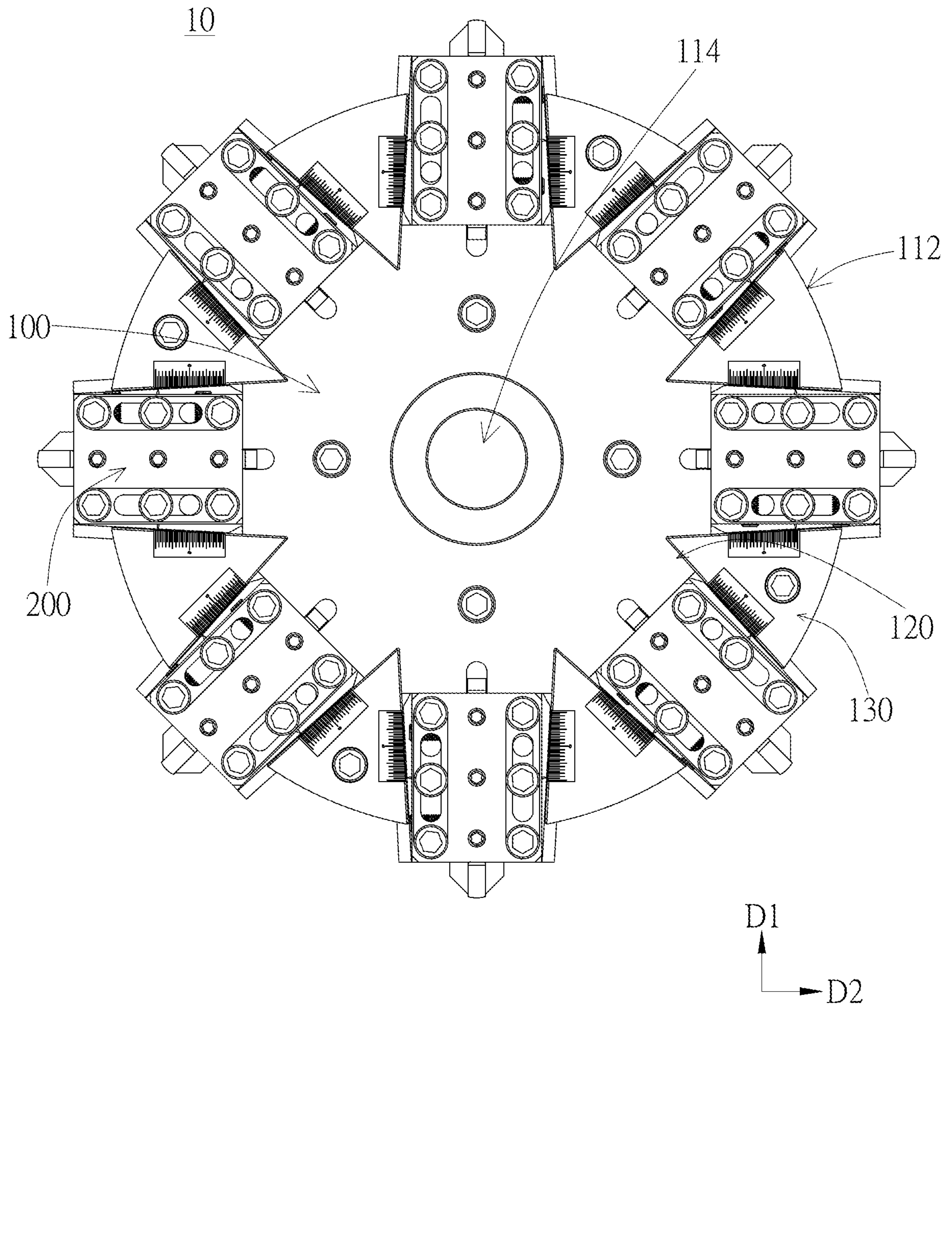
FIG. 2 is a schematic diagram illustrating a top structural view of an embodiment of a cutter module of the invention.
Figure 3:
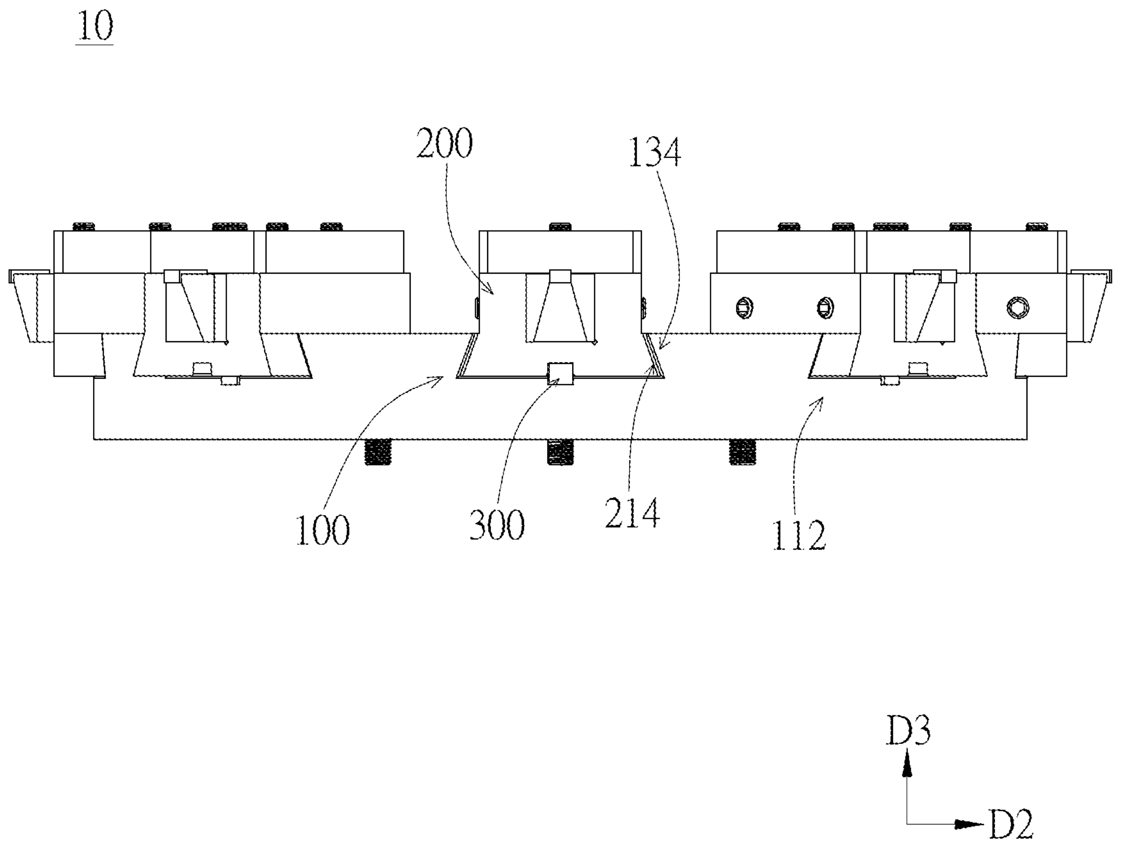
FIG. 3 is a schematic diagram illustrating a front structural view of an embodiment of a cutter module of the invention.

FIG. 1 is a schematic diagram illustrating a 3-D structural view of an embodiment of a cutter module of the invention. FIG. 2 is a schematic diagram illustrating a top structural view of an embodiment of a cutter module of the invention. FIG. 3 is a schematic diagram illustrating a front structural view of an embodiment of a cutter module of the invention. Please refer to FIG. 1 to FIG. 3. In order to present the technology and the advantages of the invention, the sizes, ratios and structural presentations in the figures will be appropriately adjusted to facilitate easy understanding of the purposes and advantages of the invention. The cutter module 10 is only used as an example and does not represent the actual size and configuration. Without departing from the spirit and scope of the invention, people skilled in the art can appropriately modify the structural design of the cutter module 10 and achieve the same effects of the invention. The cutter module 10 of the invention is suitable for various cutter machines or cutter devices. A suitable cutter module can be selected according to the processing requirements, and it does not limit the application range of the invention.

Please refer to FIG. 1 to FIG. 3. The cutter module 10 of the invention includes at least a cutter plate 100 and a knife unit 200. The knife unit 200 uses at least one knife unit (that is, one or more knife units). The number of the knife units 200 can be adjusted according to requirements, and it is not limited to any number. In the embodiment, only 8 knife units 200 are used as an example, and the number is not limited thereto. For example, 1 to 32 knife units can be used, but there is no limit.

Please refer to FIG. 1 to FIG. 3. A knife unit 200 can be disposed on the cutter plate 100 through a positioning slot 120 of the cutter plate 100. In a preferred embodiment, the disposing methods include detachable disposition and movable disposition. The number of the knife units 200 can be less than or equal to the number of the positioning slots 120. In the embodiment, eight knife units 200 and eight positioning slots 120 are used as an example, but the numbers are not limited thereto. For example, in a modified embodiment, it can have only four knife units 200 with eight positioning slots 120 for collocation, and there is no limit to the form of collocation. The center of the cutter plate 100 includes a center portion 114, and the knife units 200 are symmetrically distributed around the central portion 114. The knife units 200 are spaced apart along the edge of the cutter plate 100, as shown in FIG. 2 and FIG. 4. The number of the knife units 200 is not limited to an even number; it can also be an odd number. The knife units 200 are evenly and symmetrically distributed with the central portion 114 as the center, and it will not be further described herein.

Figure 4A:
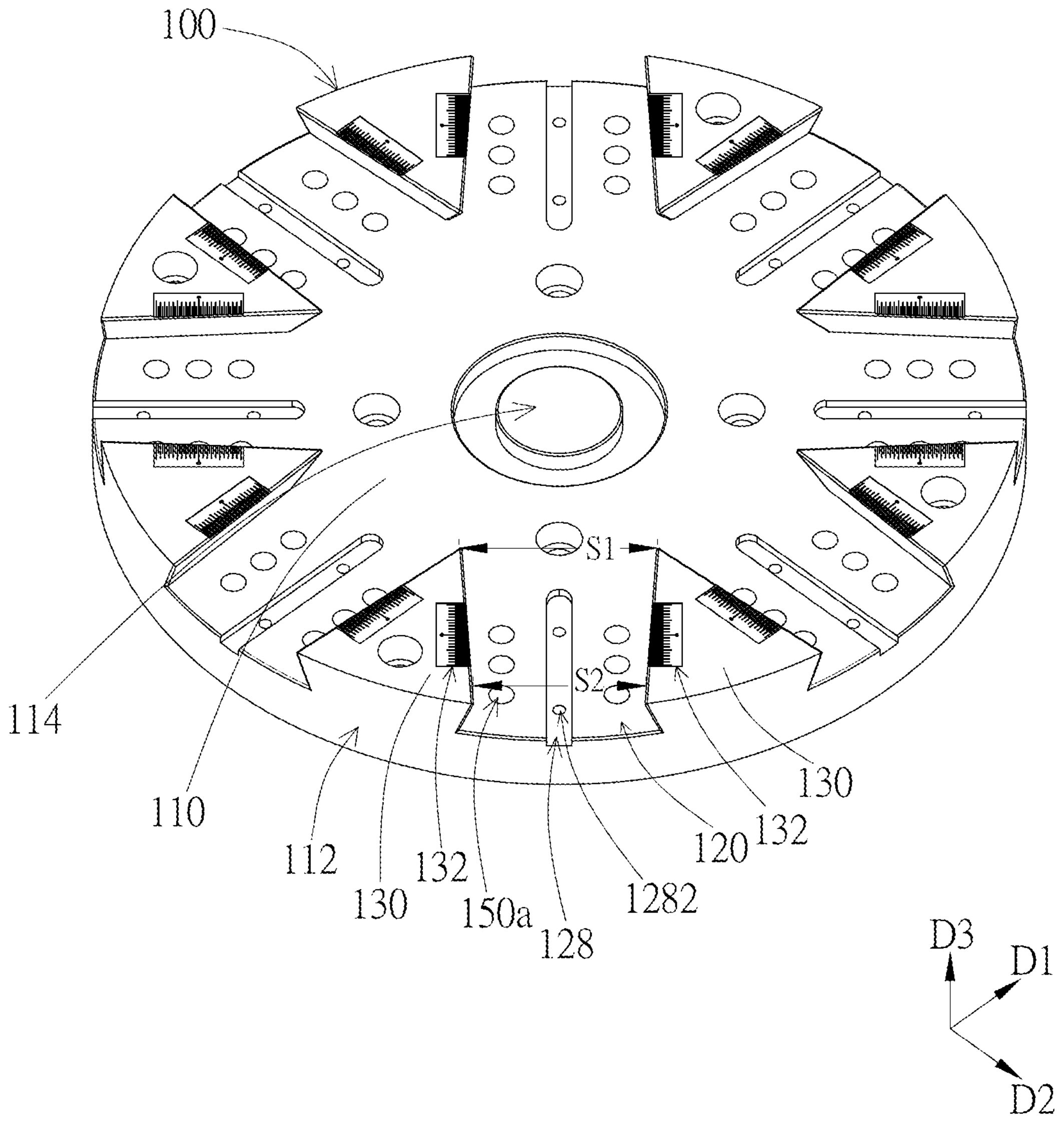
FIG. 4A is a schematic diagram illustrating a 3-D structural view of an embodiment of a cutter plate of the invention.
Figure 4B:
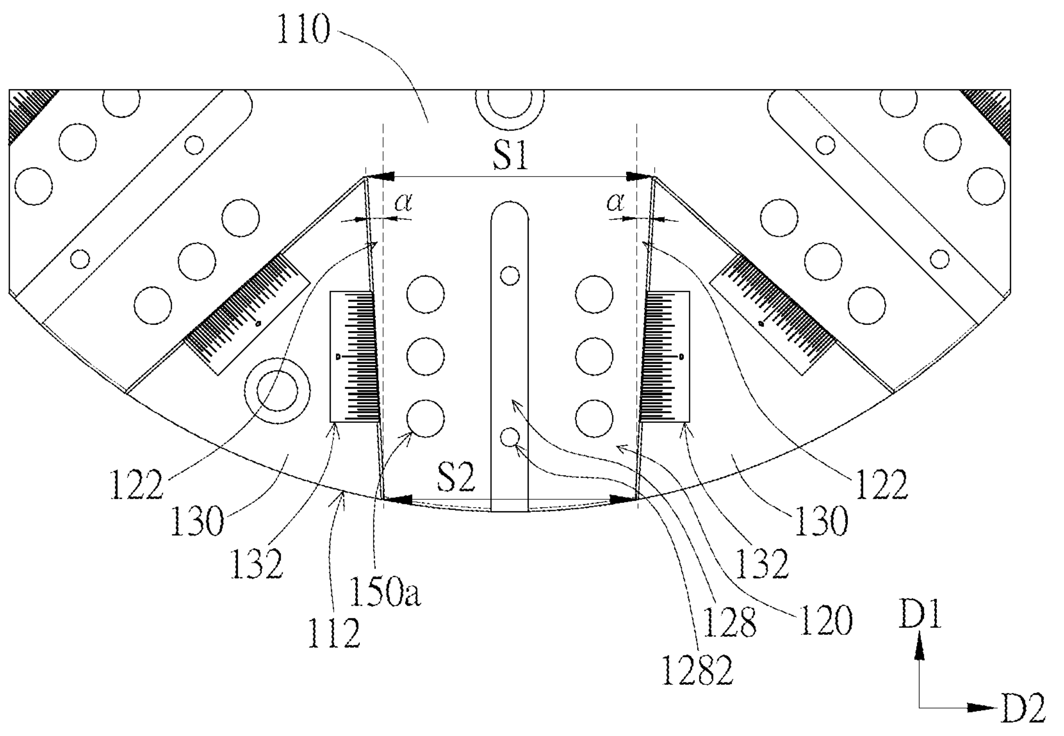
FIG. 4B is an enlarged schematic diagram illustrating a top structural view of a local area of a cutter plate of the invention.
Figure 4C:
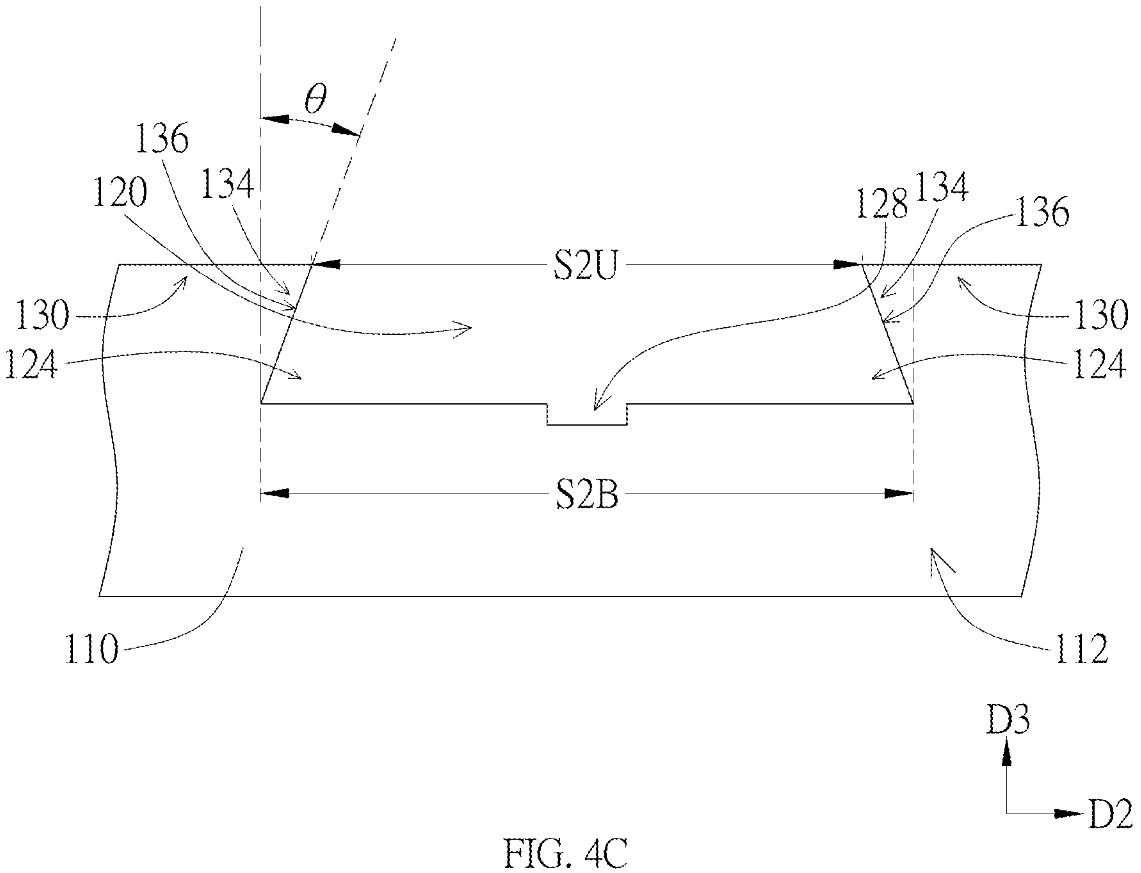
FIG. 4C is an enlarged schematic diagram illustrating a front structural view of a local area of a cutter plate of the invention.

FIG. 4A is a schematic diagram illustrating a 3-D structural view of an embodiment of a cutter plate of the invention. FIG. 4B is an enlarged schematic diagram illustrating a top structural view of a local area of a cutter plate of the invention. FIG. 4C is an enlarged schematic diagram illustrating in front structural view of a local area of a cutter plate of the invention. Referring to FIGS. 4A to 4C, the cutter plate 100 includes at least a base 110, a positioning slot 120 and a holding portion 130. The base is used to fix the knife unit 200. In the embodiment, the base 110 is a circular base as an example, but it is not limited to a circular shape. For example, the base can be replaced by an octagonal base or a hexadecagonal base, and the invention is not limited thereto.

Please refer to FIGS. 4A to 4C. The base 110 includes at least a positioning slot 120 (that is, one or more positioning slots 120). The positioning slot 120 is disposed adjacent to an edge 112 of the base 110. If there are a plurality of the positioning slots 120, these positioning slots 120 are disposed at intervals along the edge 112 of the base 110. Each of the positioning slots 120 is sandwiched between two adjacent side walls 136 of the holding portions 130, and each of the side walls 136 is protruded from the base 110. Each of the holding portions 130 is coupled to the base 110. The holding portions 130 and the base 110 can be integrally formed, or they can be separate components coupled by welding or screwing, and the coupling method is not limited thereto. The base 110 and the holding portion 130 can be made of stainless steel, for example, or other suitable materials, and the invention is not limited thereto.

In the embodiment, eight positioning slots 120 and eight holding portions 130 are respectively used as examples, but the numbers are not limited thereto. For example, in a modified embodiment, four positioning slots 120 and eight holding portions 130 can also be used for collocation, and the form of collocation is not limited. The center of the base 110 includes a center portion 114, and the center portion 114 can connect to a rotating shaft (not shown) as a bearing of the base 110. For example, four fixing screws (as shown in FIG. 4A) can be attached around the center portion 114 to connect the center portion 114 to the rotating shaft, so that the torsional load capacity of the connection between the central portion 114 and the rotating shaft can be increased. The fixing screws are not limited to four and can be adjusted according to requirements. A driving mechanism such as a motor (not shown) is used to drive the rotating shaft, so that the central portion 114 and the base 110 rotate accordingly to achieve the purpose of rotational cutting. This is well-known by people in the art and will not be described herein.

Figure 9:
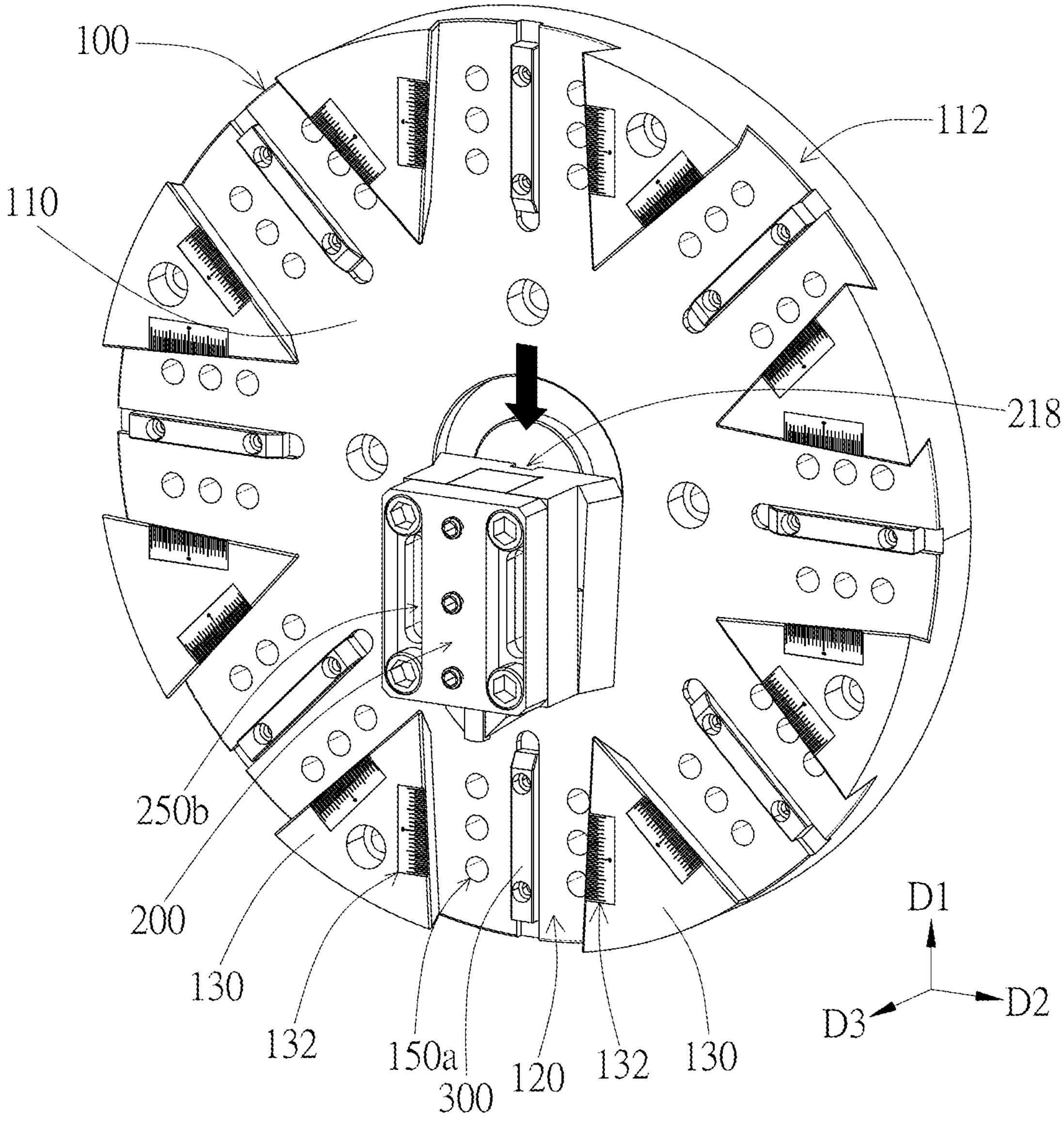

In an embodiment, as shown in the top view of FIG. 4B, each of the positioning slots 120 can be designed as an inverted trapezoidal shape, which helps the knife unit 200 to slide into the positioning slot 120 quickly and accurately and be stuck in the positioning slot 120. When the base 110 is vertically erected, the problem of the knife unit 200 accidentally falling along the vertical direction (i.e., the D1 direction) after sliding into the positioning slot 120 (as shown in FIG. 9) is reduced. Each of the positioning slots 120 includes a first spacing S1 and a second spacing S2, and the first spacing S1 and the second spacing S2 are respectively perpendicular to the radial direction of the base 110. The first spacing is near the center portion 114, and the second spacing is near the edge 112 of the base 110. The first spacing S1 is larger than the second spacing S2, forming the above-mentioned inverted trapezoidal shape. The positioning slot 120 includes two extension slots 122 extended outward on both sides. The upper edges on both sides of the positioning slot 120 respectively form two acute angles α of the extension slots 122 with the vertical direction (that is, the radial direction) of the second spacing S2, as shown in FIG. 4B. The angle α is between 1 and 15 degrees, and preferably 1 and 10 degrees, but the invention is not limited thereto. In addition, the first spacing S1 and the second spacing S2 can be the spacing measured at different portions of the top opening of the positioning slot 120, or can also be the spacing measured at different portions of the bottom of the positioning slot 120.

Figure 8:
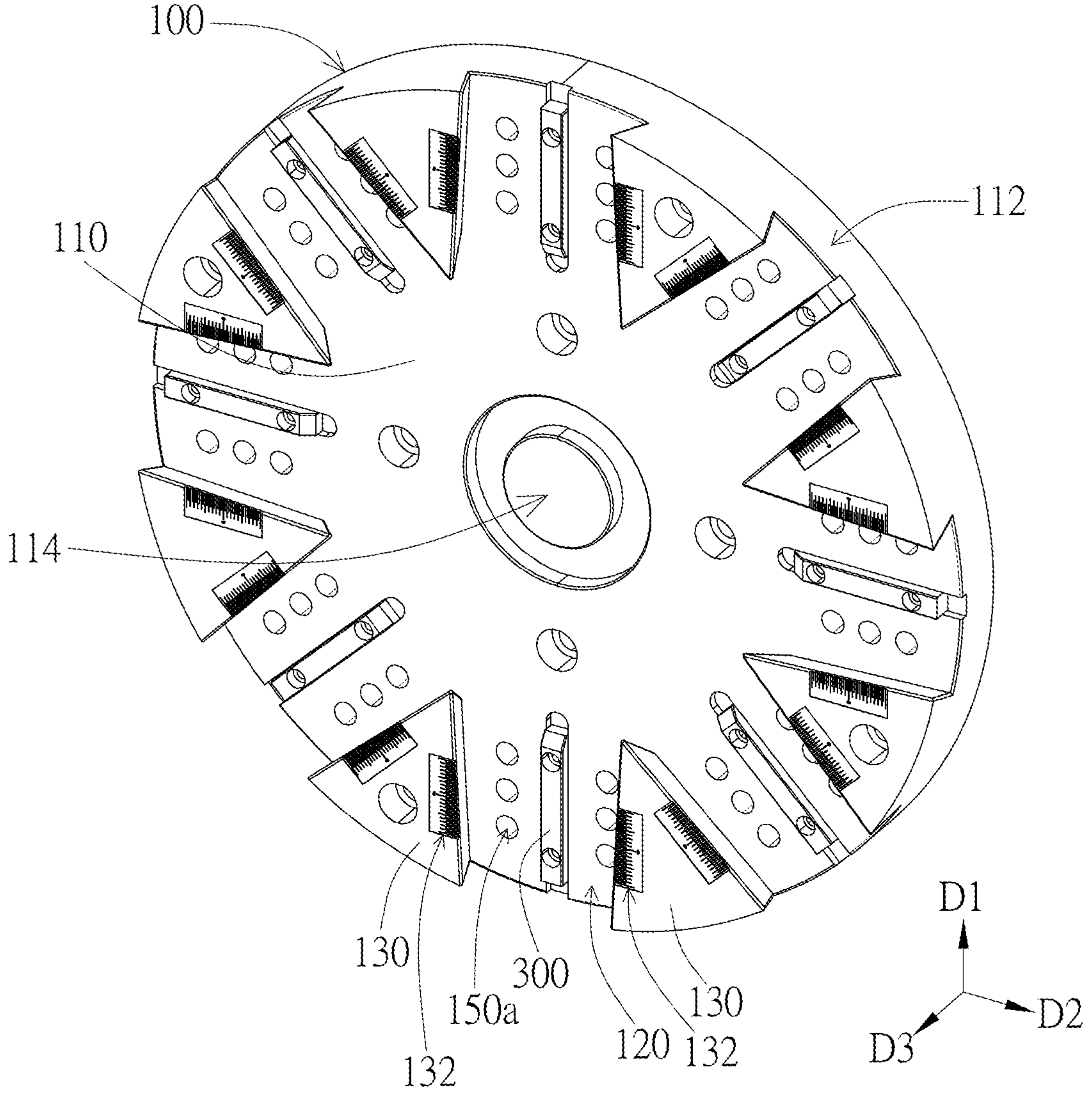
Figure 10:
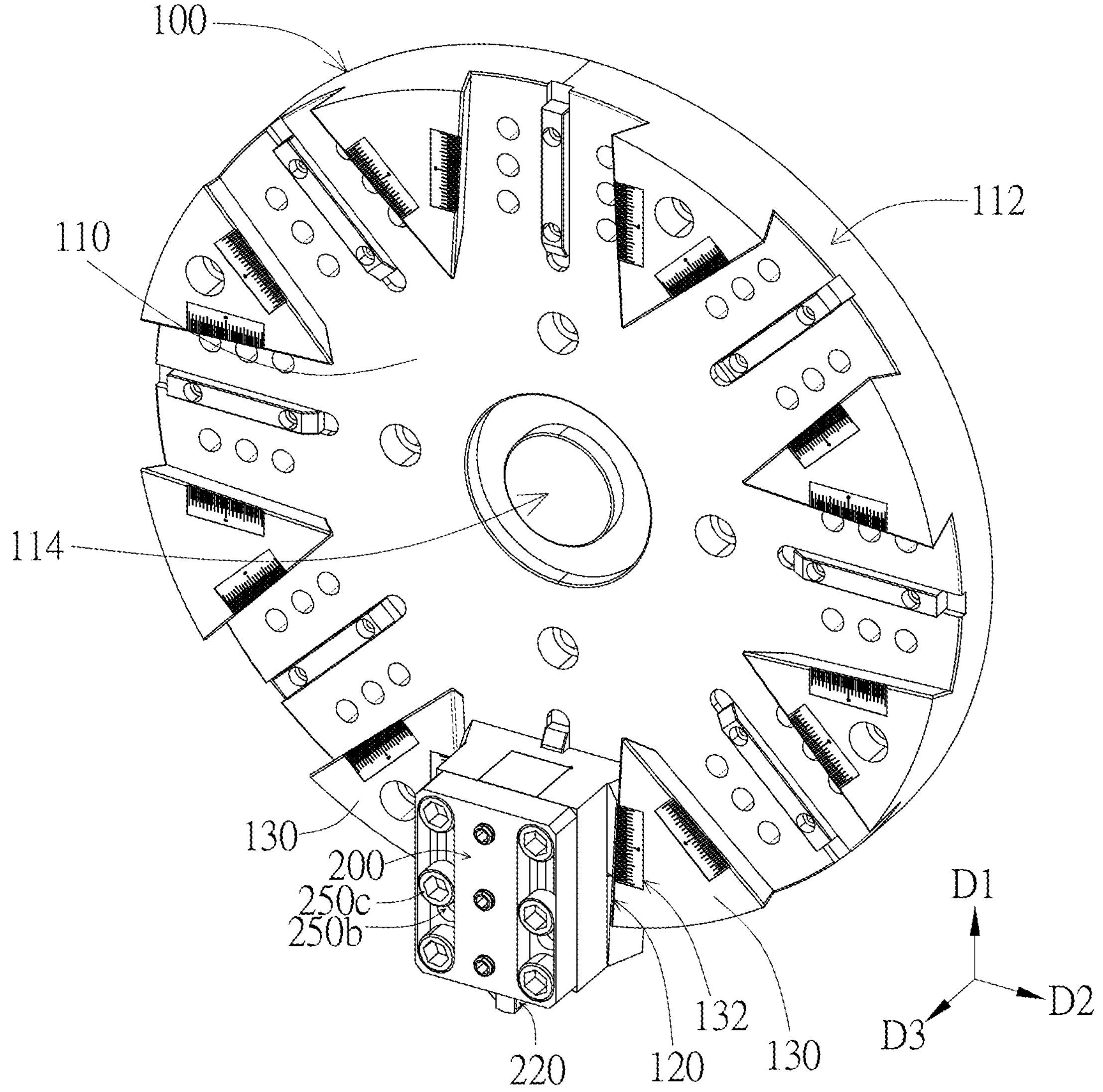

Referring to FIG. 4A to FIG. 4C, a guide rail bottom slot 128 can be optionally disposed in the center of the bottom of each of the positioning slot 120 along the radial direction of the base 110 to fix the rail 300, as shown in FIG. 8. Two locking holes 1282 can be optionally disposed at the bottom of the guide rail bottom slot 128 to improve the fixation of the guide rail 300. Two rows of positioning holes 150*a* can be disposed on both sides of the guide rail bottom slot 128, for example, there can be a sum of 6 positioning holes 150*a*, but the invention is not limited thereto. When the knife unit 200 slides into the positioning slot 120, a positioning screw 250*c* (as shown in FIG. 10) can be used to fix and position the knife unit 200 to a positioning hole 250*b* (as shown in FIG. 10) and a positioning hole 150*a*.

Refer to FIG. 4A to 4C. A positioning portion 132 can be optionally disposed on the holding portion 130 of both sides of each of the positioning slots 120. In an embodiment, the positioning portion 132 can be, for example, a positioning ruler. When the knife unit 200 slides into the positioning slot 120, the positioning portion 132 can be used to accurately position the knife unit 200. The positioning accuracy can be, for example, 1 mm or 0.1 mm, but it is not limited thereto. In a modified embodiment, if only a few positions are required, they can be replaced by positioning marks in order to achieve quick positioning. In another modified embodiment, if more accurate positioning is required, a grating digital sensor can be used to replace the positioning ruler so that positioning accuracy may be further improved.

In an embodiment, as shown in FIG. 4B, both sides of the positioning slot 120 of an inverted trapezoidal shape can be designed as vertical surfaces (not shown). In another embodiment, referring to the embodiment shown in FIGS. 4A and 4C, the inverted trapezoidal shape positioning slot 120 can be further designed to be a dovetail shape positioning slot 120 with an inclined side wall 136 to improve locking capability in the D3 direction when the knife unit 200 slides into the positioning slot 120, and reduce the problem of the knife unit 200 falling due to inclining. The positioning slot 120 can have an inclined side wall 136 by having two inclined convex portions 134 of the holding portion 130 on both sides in order to correspondingly form auxiliary side concave slots 124 on both sides of the positioning slot 120 (shown in FIG. 4C). The inward inclined side concave slot 124, together with the side convex portion 214 (as shown in FIG. 5C) of the knife unit 200, can prevent the knife unit 200 from falling due to inclining in the D3 direction. Take the position of the dovetail positioning slot 120 at the second spacing S2 as an example. The bottom distance S2B of the positioning slot 120 is larger than the top distance S2U. Therefore, when the knife unit 200 slides into the positioning slot 120, the two side convex portions 214 of the knife unit 200 can be stuck by the inclined convex portions 134 on the two sides. The side walls of the side concave slots 124 on both sides of the positioning slot 120 form an acute angle θ with the vertical normal direction of the surface of the base 110, as shown in FIG. 4C. The acute angle θ is between 1 to 30 degrees, and is preferably 1 to 20 degrees, but it is not limited thereto. When the cutter plate 100 is vertically erected and the knife unit 200 slides vertically into the positioning slot 120, as shown in FIG. 9, the inclining and falling of the knife unit 200 along the vertical direction (i.e., the D3 direction) of the surface of the base 110 can be reduced.

Figure 5A:
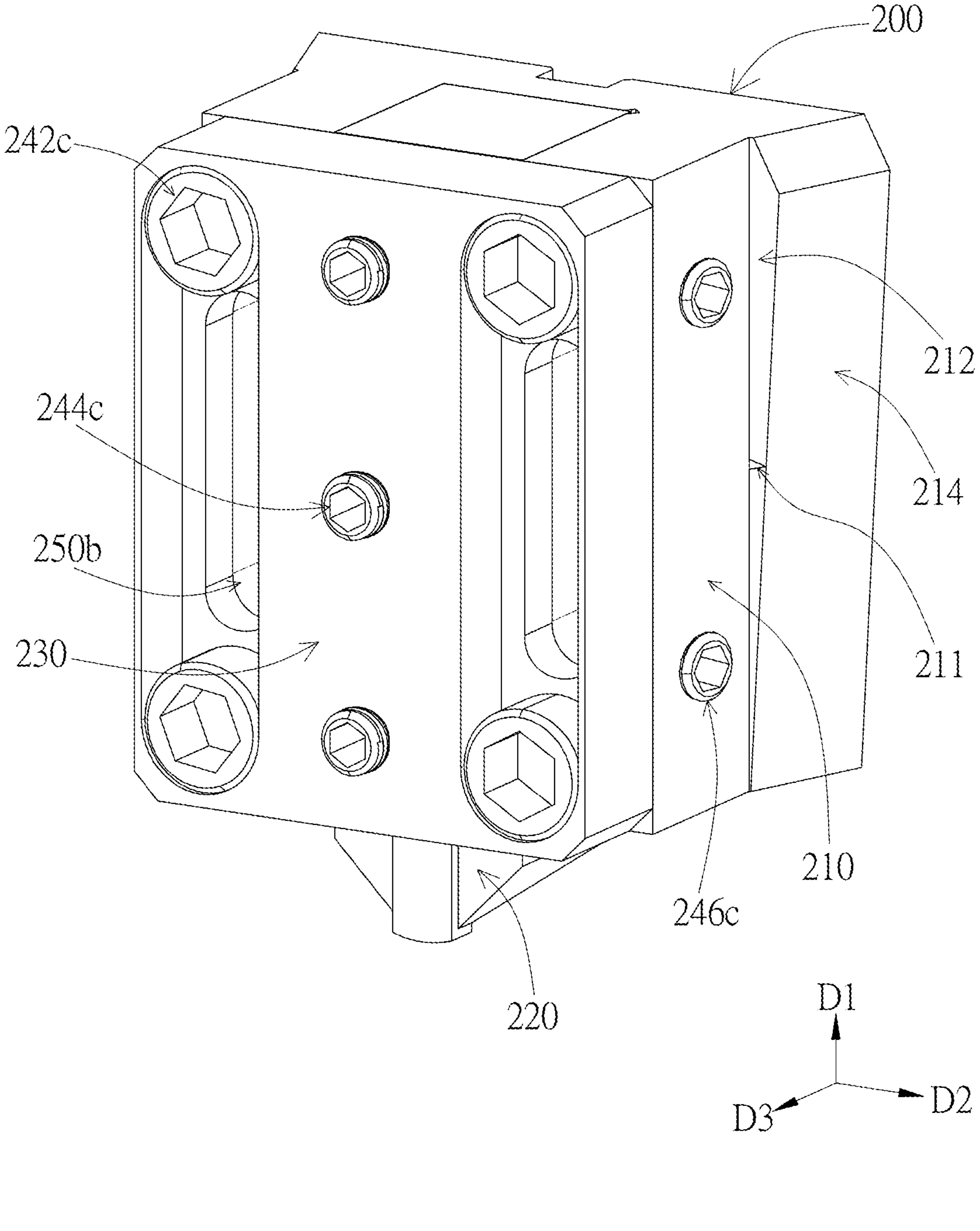
FIG. 5A is a schematic diagram illustrating a 3-D structural view of an embodiment of a knife unit of the invention.
Figure 5B:
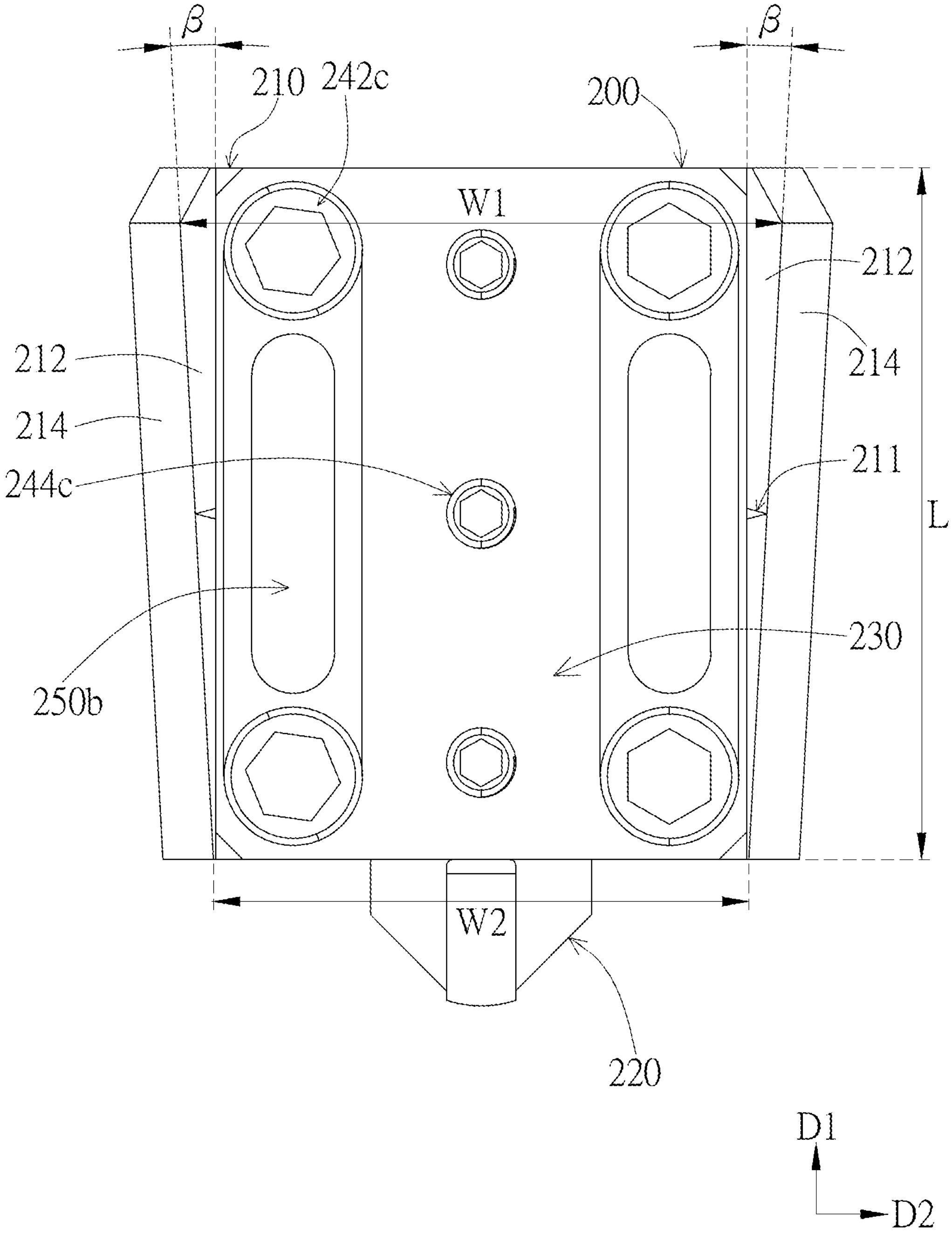
FIG. 5B is a schematic diagram illustrating a top structural view of an embodiment of a knife unit of the invention.
Figure 5C:
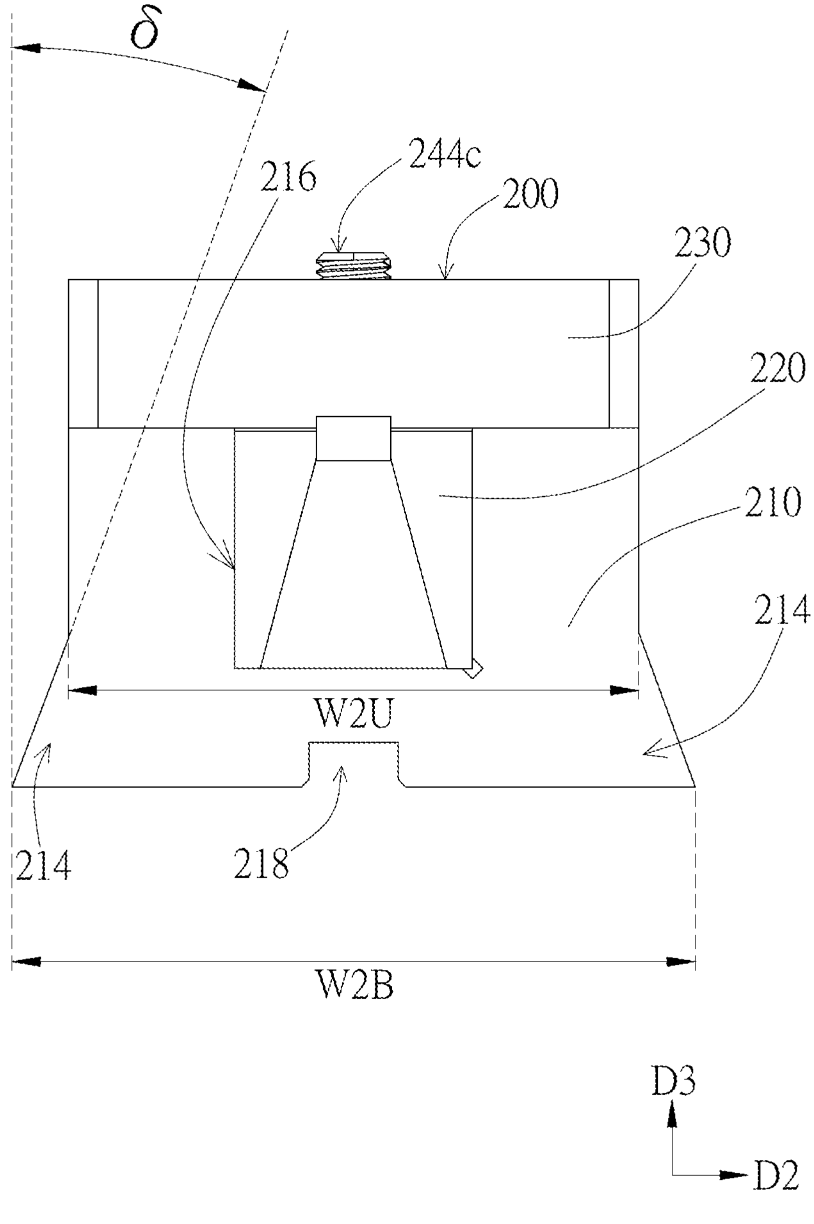
FIG. 5C is a schematic diagram illustrating a front structural view of an embodiment of a knife unit of the invention.
Figure 6:
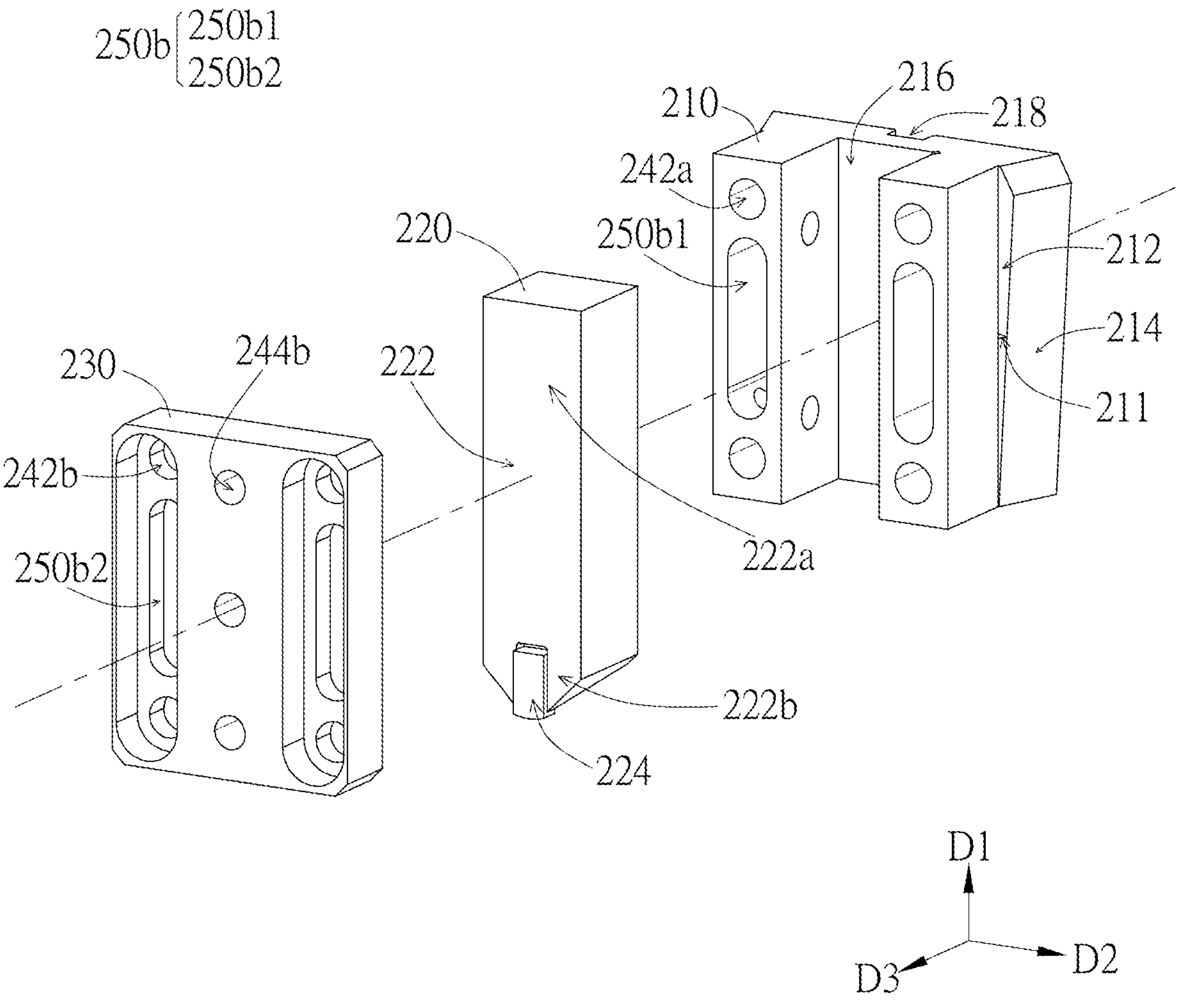
FIG. 6 is a schematic diagram illustrating an exploded structural view of an embodiment of a knife unit of the invention.
Figure 7:
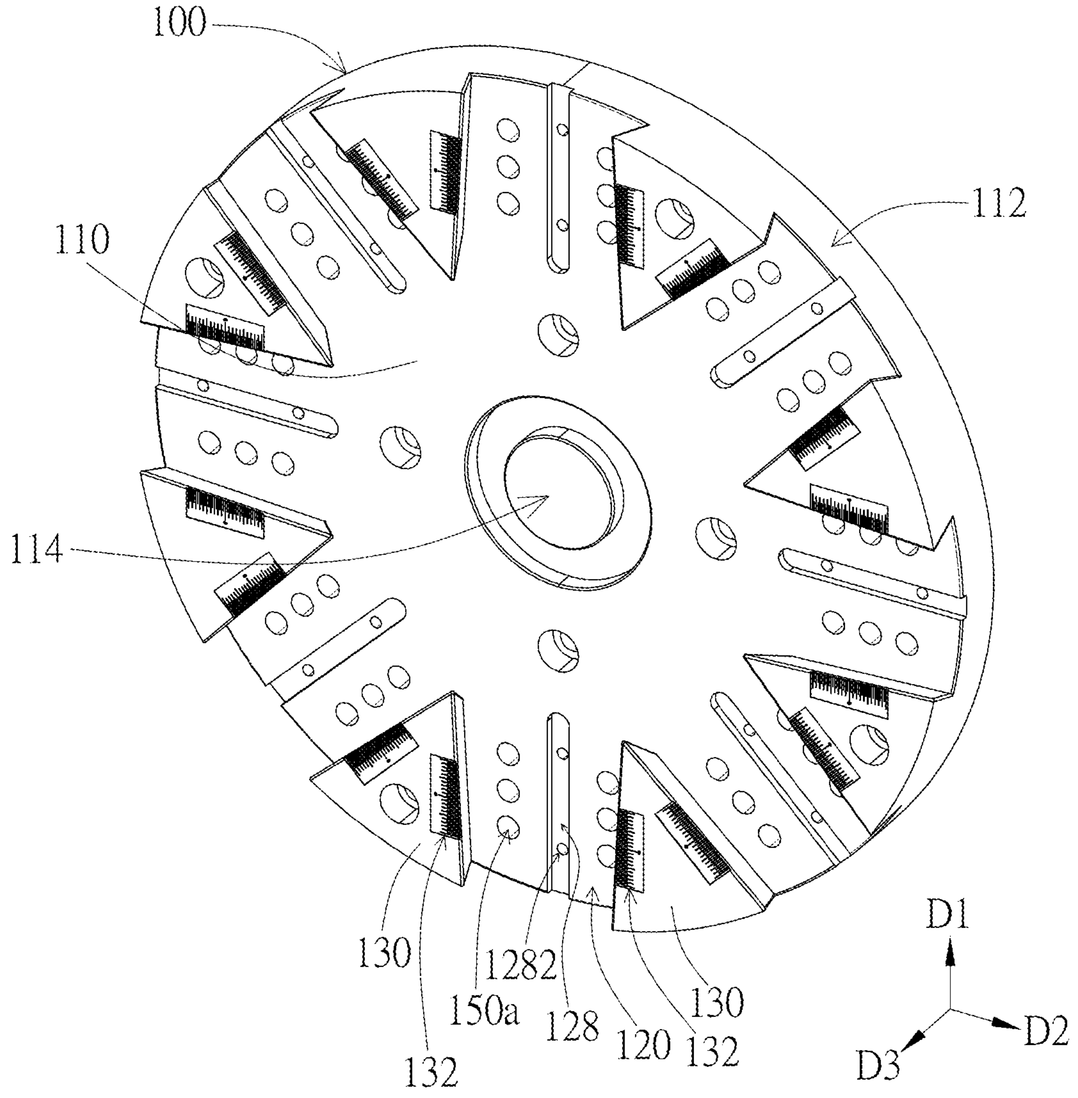
FIG. 7 to FIG. 10 are schematic diagrams illustrating the assembly flow charts of an embodiment of a cutter module of the invention.

FIG. 5A is a schematic diagram illustrating a 3-D structural view of an embodiment of a knife unit of the invention. FIG. 5B is a schematic diagram illustrating a top structural view of an embodiment of a knife unit of the invention. FIG. 5C is a schematic diagram illustrating a front structural view of an embodiment of a knife unit of the invention. FIG. 6 is a schematic diagram illustrating an exploded structural view of an embodiment of a knife unit of the invention. Please refer to FIG. 5A to FIG. 6. The knife unit 200 includes at least a knife holder 210, a knife 220 and a knife cover 230. The knife 220 may be called the knife body. The knife 220 is sandwiched between the knife holder 210 and the knife cover 230, and the knife 200 is fixed by the knife holder 210 and the knife cover 230. For example, a knife groove 216 may be designed in center of the knife holder 210 to accommodate the knife 220. The knife holder 210 and the knife cover 230 are designed to have a set of locking holes 242*a* and a set of locking holes 242*b* respectively corresponding to a set of locking screws 242*c*. For example, four locking holes 242*a* are designed to be in the four corners of the knife holder 210, and four locking holes 242*b* are correspondingly designed to be in the four corners of the knife cover 230. Pass the locking screws 242*c* through the locking holes 242*b* to perform screw locking with the locking holes 242*a* and fix the knife 220; however, the invention is not limited thereto. In order to fix the knife 220, three locking holes 244*b* can be designed in the center of the knife cover 230. Pass the locking screws 244*c* through the locking holes 244*b* to perform screw locking on the top surface of the knife 220. If necessary, locking screws 246*c* can be optionally designed to pass through locking holes (not shown) on the side surface of the knife 220, so as to perform screw locking on the side surface of the knife 200. When the base 110 rotates, the knife 220 can be stably driven to rotate.

Please refer to FIG. 5A to FIG. 6. A guide rail top slot 218 can be designed on the surface opposite to the knife groove 216 on the bottom of the knife holder 210 in order to facilitate sliding on the guide rail 300. When the knife unit 200 slides into the positioning slot 120, the knife holder 210 of the knife unit 200 slides along the guide rail 300 by collocating the guide rail 300 and the guide rail top slot 218, so as to improve the positioning capability of the knife unit 200. After the knife unit 200 slides into the positioning slot 120, the positioning portion 132 can be used for accurate positioning. The knife unit 200 further includes a pair of positioning holes 250*b* and a pair of positioning screws 250*c* on both sides of the knife 220. Each of the positioning holes 250*b* includes a strip-shaped positioning hole 250*b*1 on the knife holder 210 and a strip-shaped positioning hole 250*b*2 on the knife cover 230, and the strip-shaped design can be extended parallel to an extended direction of the guide rail top slot 218. Then, the positioning screws 250*c* (shown in FIG. 10) on both sides of the knife 220 pass through the strip-shaped positioning holes 250*b*2 of the knife cover 230 and the strip-shaped positioning hole 250*b*1 on the knife holder 210 to perform screw locking with positioning holes 150*a* (shown in FIG. 4A) of the base 110, so as to perform accurate positioning and locking for the knife unit 200.

Please refer to FIG. 5A to FIG. 6. The knife 220 includes at least a knife body 222 and a knife head 224. The knife body 222 includes an embedded portion 222*a* and an extended portion 222*b*. The embedded portion 222*a* is sandwiched between the knife holder 210 and the knife cover 230, and the extended portion 222*b* protrudes from the knife holder 210 and the knife cover 230. After the knife unit 220 is fixed on the positioning slot 120, the knife head 224 protrudes from the edge 112 of the base 110 along the radial direction of the base 110, as shown in FIG. 10. The knife head 224 is fixed on the front end of the extended portion 222*b* to perform cutting or shearing on a processing workpiece and forming the required cutting pattern on the surface of the processing workpiece. The knife head 224 can be hard materials such as stainless steel, high carbon steel, tungsten, tungsten steel, adamas, diamond, etc., but is not limited thereto. Materials that can be used as a processing workpiece are, for example, wood, plastic, glass, metal, ceramics, etc., but is not limited thereto.

In an embodiment, as shown in the top view of FIG. 5B, the knife holder 210 of the knife unit 200 of the invention adopts an inverted trapezoid design. The two side walls of the knife holder 210 of the inverted trapezoid design can be designed as vertical surfaces (not shown), which correspond to the inverted trapezoid positioning slots 120 (not shown). Extending portions 212 are designed to be on both sides of the knife holder 210 of the knife unit 200 to correspond to the extension slots 122 of the positioning slot 120. When the cutter plate 100 is vertically erected to let the knife unit 200 vertically slide into the positioning slot 120, the fact that the extending portions 212 on both sides can be stuck in the extension slot 122 can be used to reduce the probability of the knife unit 200 vertically falling along the D1 direction, as shown in FIG. 9.

The knife holder 210 of each of the knife units 200 includes a length L, a first width W1 and a second width W2, wherein the first width W1 and the second width W2 are respectively perpendicular to the length L. The first width W1 is away from the knife head 224 of the knife 220; the second width W2 is near the knife head 224, and the first width W1 is larger than the second width W2, so as to form an inverted trapezoid shape. The first width W1 can be calculated from the width of the most bottom edge. If there are chamfered designs on both sides of the bottom edge, as shown in FIG. 5B, the widest part can be used as the first width W1. The knife holder 210 includes two extending portions 212 extending outward from both sides. The upper edge on both sides of the knife holder 210 respectively form two acute angles β of the extending portions 212 with the vertical direction (i.e., the length direction) of the second width W2. The included angle β is, for example, between 1 to 15 degrees, preferably between 1 to 10 degrees, but is not limited thereto. The included angle β of the extending portion 212 can be smaller than or equal to the included angle α of the extension slot 122, so as to avoid the situation where the extending portion 212 cannot slide into the extension slot 122. A positioning mark 211 can be optionally disposed at the center position of both sides of the extending portions 212 of the knife unit 200. After the knife unit 200 slides into the positioning slot 120, the positioning mark 211 can be used to assist the positioning of the knife unit 200 and the positioning portions 132 on both sides of the positioning slot 120.

In an embodiment, as shown in the top view of FIG. 5B, the side walls on both sides of the knife holder 210 of the inverted trapezoid design can be designed as vertical surfaces (not shown) and correspond to the positioning slot 120 with the inverted trapezoid design (not shown). In addition, in another embodiment (please refer to embodiment of FIG. 5A to FIG. 6), the inverted trapezoid-shaped design knife holder 210 can be further designed to be a dovetail-shaped knife holder 210 with an inclined surface corresponding to the dovetail-shaped positioning slot 120, so that the locking capability along the direction D3 on the knife unit 200 when it slides into the positioning slot 120 can be improved, and the problem of the knife unit 200 falling due to inclining can be further reduced. The auxiliary side convex portions 214 formed on both sides of the knife holder 210 correspond to the side concave slots 124 on both sides of the positioning slot 120, so that the problem of the knife unit 200 falling off can be further prevented. Take the position of the second width W2 of the dovetail-shaped knife holder 210 as an example. The bottom width W2B is larger than the top width W2U. Thus, when the knife unit 200 slides into the positioning slot 120, the inclined convex portions 134 above the side convex portion 124 of the two sides of the knife unit 200 can be stuck with the side convex portions 214 on both sides of the knife holder 210, as shown in FIG. 3. After the cutter plate 100 is vertically erected, when the knife unit 200 vertically slides into the positioning slot 120, as shown in FIG. 9, it can reduce the inclining and falling of the knife unit 200 along the vertical direction of the surface of the base 110 (i.e., the direction D3). The side walls of the side convex portions 214 on both sides of the knife holder 210 form an acute angle & with the vertical direction of the bottom surface of the knife holder 210, as shown in FIG. 5C. The included angle δ of the side convex portion 214 can be between 1 to 30 degrees, preferably between 1 to 20 degrees, but is not limited thereto. The included angle δ of the side convex portion 214 can be smaller than or equal to the included angle θ of the side convex portion 124 to prevent the side convex portion 214 from not smoothly sliding into the side convex portion 124.

FIG. 7 to FIG. 10 are schematic diagrams illustrating the assembly flow charts of an embodiment of a cutter module of the invention. The cutter module 10 is usually vertically erected during processing. Please refer to FIG. 7. The cutter plate 100 can be vertically erected for assembling by an operator when the knife unit 200 is assembled or changed. Please refer to FIG. 8. Next, a guide rail 300 is placed into each of the guide rail bottom slots 128, and locking holes 1282 in the bottom portion of the guide rail bottom slot 128 are used to fix the guide rail 300. Please refer to FIG. 9. The fabricated knife unit 200 is slid into the positioning slot 120, and the knife unit 200 can be positioned along the horizontal direction (i.e., the D2 direction) by the guide rail 300. At the same time, the knife unit 200 can be positioned at a circumferential angle, for example, at the position of 180 degrees, so as to avoid positioning errors of the knife unit 200 caused by rotational deviation of the base 110. Please refer to FIG. 10. At last, the positioning portion 132 and the positioning screw 250*c* can be used to position the knife unit 200 in the radial direction, for example, the vertical direction (i.e., the D1 direction), and the distance between the knife head 224 and the center of the rotation axis of the base 110 can be determined. Then, the base 110 can be rotated 45 degrees to fabricate and position the next knife unit 200. After all the knife units 200 are fabricated, the knife heads 224 of all the knife units 200 can be accurately positioned to keep the same distance from the center of the rotating shaft. Thus, the base 110 can be ensured to rotate, and the knife head 224 can be ensured to have a uniform and good processing effect.

Figure 11:
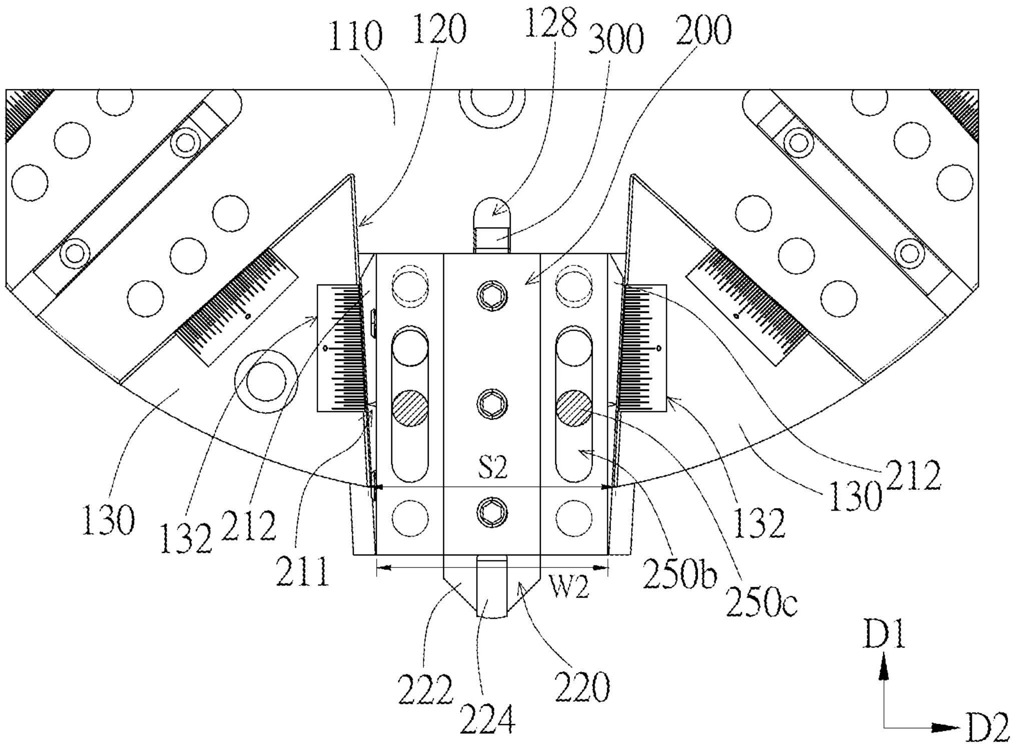
FIG. 11 is a schematic diagram illustrating a top structural view of an embodiment of the base of a knife unit being pulled to the lower limit of the invention.

FIG. 11 is a schematic diagram illustrating a top structural view of an embodiment of the base of a knife unit being pulled to the lower limit of the invention. The second width W2 of the knife holder 210 can be designed to be equal to or smaller than the second spacing S2 of the positioning slot 120, and the first width W1 of the knife holder 210 can also be designed to be equal to or smaller than the first spacing S1 of the positioning slot 120. The first width W1 of the knife holder 210 can be designed to be larger than the second spacing S2 of the positioning slot 120, so that the knife unit 200 can be prevented from vertically sliding downward and out of the positioning slot 120. In an embodiment, the second width W2 is designed to be equal to the second spacing S2 and the outer surface of the knife holder 210 can be approximately aligned to the edge 112 of the base 110, so that the knife holder 210 can be stuck on the edge 112 of the base 110. In another embodiment, the second width W2 is approximately designed to be smaller than the second spacing S2, as shown in FIG. 11, and the extension length of the knife unit 200 can be convenient to adjust. The knife holder 210 of the knife unit 200 can be pushed upward to an upper limit position (not shown), and the positioning mark 211 can be aligned with the upper edge mark of the positioning portion 132 (i.e., the positioning ruler). The knife holder 210 of the knife unit 200 can also be elongated to push downward to a lower limit position, and the positioning mark 211 can be aligned with the lower edge mark of the positioning portion 132 (i.e., the positioning ruler). The outer side surface of the knife holder 210 and the knife head 224 both extend outward and protrude from the edge 112 of the base 110, so as to reach the maximum extension amount. The knife 220 of the knife unit 200 extends outward, which can improve the problem of insufficient machine stroke for processing thin workpieces.

In addition, when the cutter module 10 processes a processing workpiece, unnecessary heat energy is easily generated at the processing position. Thus, a set of cooling unit (not shown) can be optionally attached to the center portion 114 of the cutter plate 100. The cooling unit, for example, includes at least a connecting pipe, a tapping part and a spraying pipe. The connecting pipe is coupled to the center of the tapping part. By attaching the tapping part to the center portion 114, the spraying pipe can be coupled to the four sides of the tapping part to spray outward. The number of the spraying pipes can be, for example, four, but it is not limited thereto. Cooling gas or liquid can be input through the connecting pipe. Gas may be, for example, air, and liquid may be water, but it is not limited thereto. In addition, in a modified embodiment, the cooling unit can be replaced by a cooling pipe which is disposed near the cutter module 10 and the processing workpiece. The cooling pipe can be used to directly spray cooling gas or liquid to the processing position in order to take away the heat energy generated by processing, so as to prevent heat energy from affecting the processing effect of the workpiece.

As described above, the invention provides a cutter module. The positioning slot and the knife holder are designed to be an inverted trapezoid shape, so that the first spacing of the positioning slot is larger than the second spacing, and the first width of the knife holder is larger than the second width. Thus, the knife unit can be quickly replaced, and the problem of the knife unit falling can be reduced. In addition, the positioning slot and the knife holder can be designed to be a dovetail shape. Both sides of the positioning slot and the knife holder respectively include a pair of side concave slots and a pair of side convex portion corresponding to each other. The knife unit can slide into the positioning slot more stably due to the narrow top and wide bottom design, so chances of the knife unit falling can be further reduced. The extension length of the knife unit can be quickly and accurately adjusted by the positioning screws and the positioning holes, so that the extension length of the knife unit can be consistent and the uniformity of processing is improved.

The above descriptions are only some preferred embodiments of the present invention. It should be noted that various changes and modifications can be made to the present invention without departing from the spirit and principles of the present invention. A person of ordinary skill in the art should clearly understand that the present invention is defined by the appended claims, and all possible changes such as substitutions, combinations, modifications, and diversions are within the scope of the present invention defined by the appended claims in line with the purpose of this invention.

What is claimed is:

1. A cutter module, comprising:

a cutter plate having a base and at least one positioning slot on the base, the positioning slot being disposed along an edge of the base and sandwiched between two adjacent side walls, each of the side walls protruding from the base, wherein the positioning slot has a first spacing and a second spacing, the second spacing is nearer to the edge of the base than the first spacing, and the first spacing is larger than the second spacing; and at least one knife unit correspondingly disposed in the at least one positioning slot, wherein the knife unit has a first width and a second width, and the first width is larger than the second width; and at least one guide rail, wherein the guide rail is correspondingly fixed on a guide rail bottom slot at a bottom of the positioning slot.

2. The cutter module of claim 1, wherein an extending direction of the first spacing and an extending direction of the second spacing are respectively perpendicular to a radial direction of the base.

3. The cutter module of claim 1, wherein the first width and the second width of the knife unit correspond to the first spacing and the second spacing of the positioning slot, respectively.

4. The cutter module of claim 1, wherein the positioning slot comprises a pair of extension slots disposed on two sides of the positioning slot.

5. The cutter module of claim 4, wherein the knife unit comprises a pair of extension portions disposed on two sides of the knife unit, and the pair of extension portions correspond to the pair of extension slots, respectively.

6. The cutter module of claim 1, wherein the knife unit further comprises a guide rail top slot configured to slide on the guide rail.

7. The cutter module of claim 1, wherein the knife unit comprises a knife holder, a knife and a knife cover, and the knife is placed between the knife holder and the knife cover.

8. The cutter module of claim 6, wherein the knife comprises a knife body and a knife head, the knife body is placed between the knife holder and the knife cover, the knife head protrudes from the knife holder and the knife cover, and the knife head protrudes from the edge of the base along a radial direction of the base.

9. The cutter module of claim 7, wherein each of the at least one knife unit further comprises a pair of positioning screws and a pair of positioning holes, the pair of positioning holes are disposed on two sides of the knife and penetrate through the knife cover and the knife holder, and the pair of the positioning screws pass through the pair of positioning holes to fix the knife unit to the positioning slot.

10. The cutter module of claim 1, wherein the positioning slot further comprises a pair of side concave slots disposed on two sides of the positioning slot, the positioning slot has a bottom gap near a bottom of the positioning slot and a top gap away from the bottom of the positioning slot, and the bottom gap of the positioning slot is larger than the top gap.

11. The cutter module of claim 8, wherein a pair of holding parts are disposed adjacent to two sides of the positioning slot, the holding parts respectively comprise an inclined convex portion respectively inclined toward the positioning slot to form the pair of side concave slots.

12. The cutter module of claim 1, wherein the knife unit further comprises a bottom width near a bottom of the positioning slot and a top width away from the bottom of the positioning slot, and the bottom width of the knife unit is larger than the top width.

13. The cutter module of claim 1, wherein a pair of positioning portions are disposed on the pair of holding parts and configured to assist positioning of the knife unit after the knife unit slides into the positioning slot.

14. The cutter module of claim 12, wherein each of the at least one knife unit further comprises a pair of positioning marks disposed on two sides of the knife unit to assist positioning of the knife unit with the pair of positioning portions.

15. The cutter module of claim 1, wherein the first width of the knife unit is less than or equal to the first spacing of the positioning slot, and the second width of the knife unit is less than or equal to the second spacing of the positioning slot.

16. The cutter module of claim 1, wherein the first width of the knife unit is larger than the second spacing of the positioning slot.

* * * * *